(No Model.) 3 Sheets—Sheet 1.
P. ZIEGLER.
TILL ALARM.
No. 502,945. Patented Aug. 8, 1893.
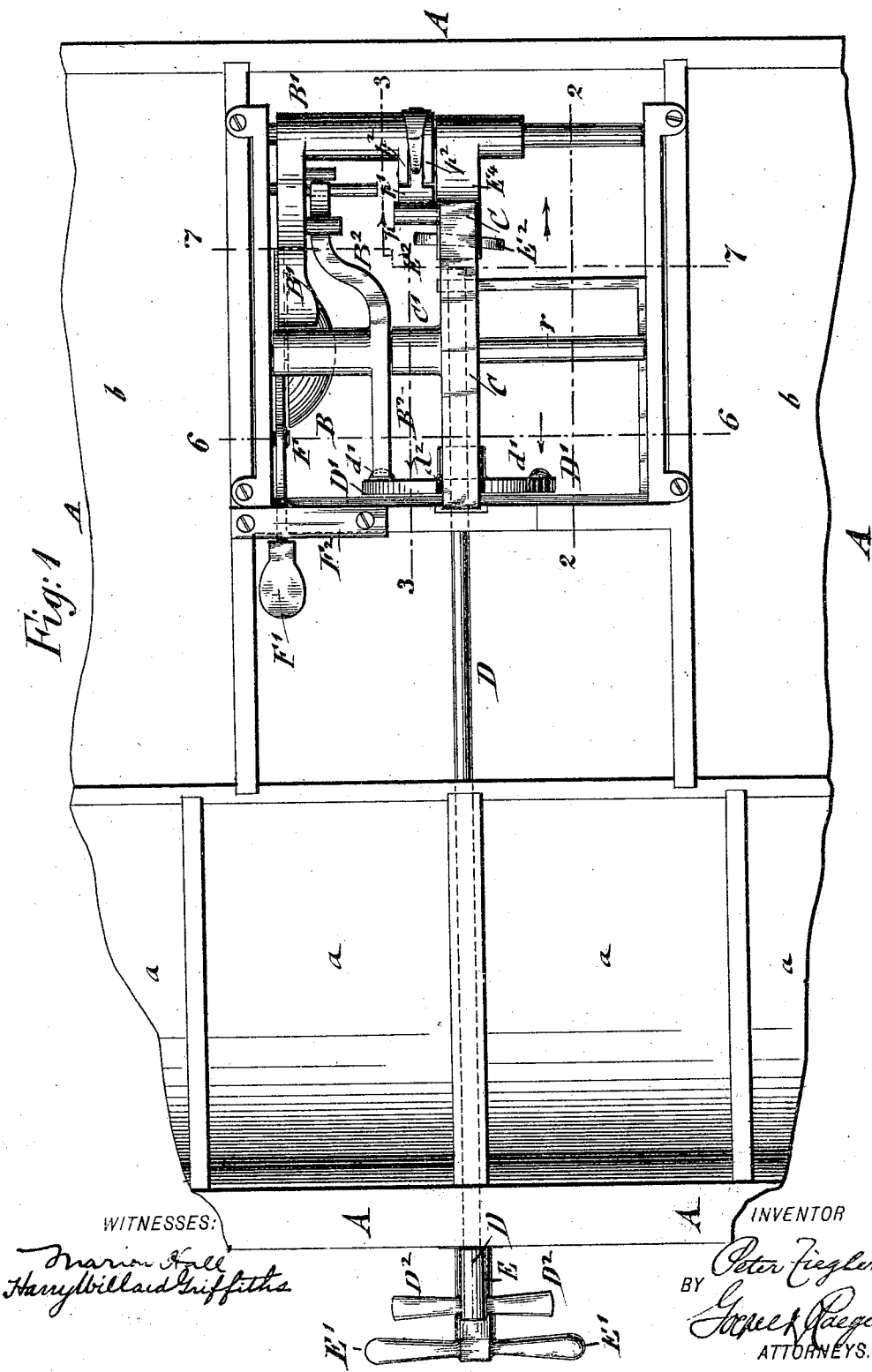
WITNESSES:
Marion Hall
Harry Billard Griffiths
INVENTOR
Peter Ziegler
BY
ATTORNEYS.

(No Model.) 3 Sheets—Sheet 2.

P. ZIEGLER.
TILL ALARM.

No. 502,945. Patented Aug. 8, 1893.

WITNESSES:

INVENTOR
Peter Ziegler
BY
ATTORNEYS.

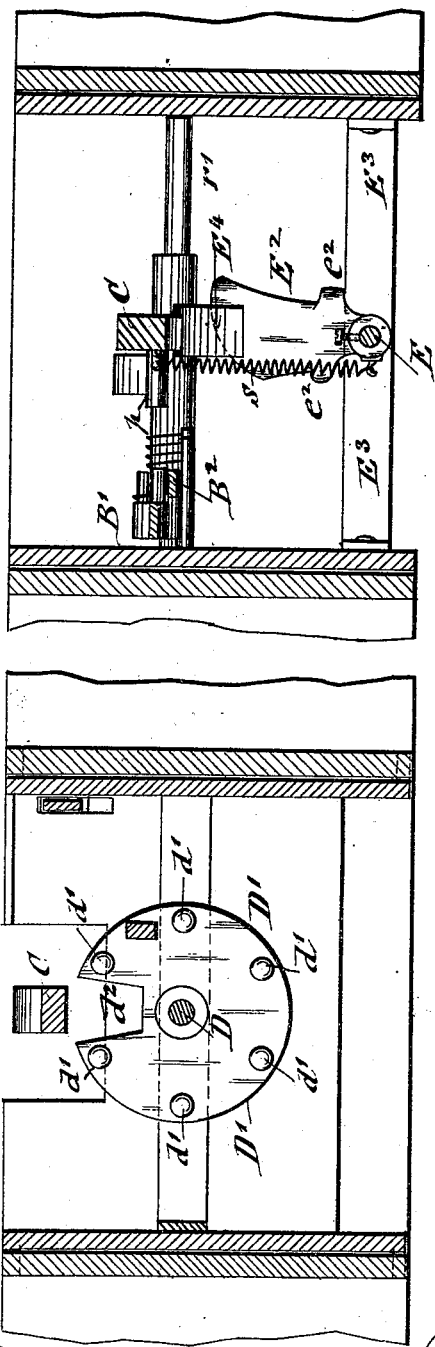

UNITED STATES PATENT OFFICE.

PETER ZIEGLER, OF BROOKLYN, NEW YORK.

TILL-ALARM.

SPECIFICATION forming part of Letters Patent No. 502,945, dated August 8, 1893.

Application filed January 17, 1893. Serial No. 458,659. (No model.)

*To all whom it may concern:*

Be it known that I, PETER ZIEGLER, a citizen of the Empire of Germany, residing in the city of Brooklyn, Kings county, State of New York, have invented certain new and useful Improvements in Alarm Devices for Money-Tills, of which the following is a specification.

This invention relates to certain improvements in alarm-devices for money-tills, by which any attempt made for opening the till is indicated by the striking of a bell and by which the money-till can only be opened when the actuating disk of the alarm-device is set into a certain position, so that the locking-lever can be oscillated and the till be opened; and the invention consists of an alarm-device for money-tills which is actuated by a spindle carrying a disk having projections and a spring-tongue actuated by said projections so as to operate an alarm-bell. The actuating disk is provided with a recess for the fulcrumed locking-lever of the till, into which recess the locking-lever is moved by a spindle and intermediate mechanism when said recess is in line with the lever, so that the till can be opened. The ringing of the alarm-device can be discontinued if desired by a suitable bell-crank mechanism by which the spring-tongue is moved, so that the same is prevented from being operated by the actuating disk.

The invention consists further of certain details of construction and combination of parts which will be fully described hereinafter and finally pointed out in the claims.

Figure 3:
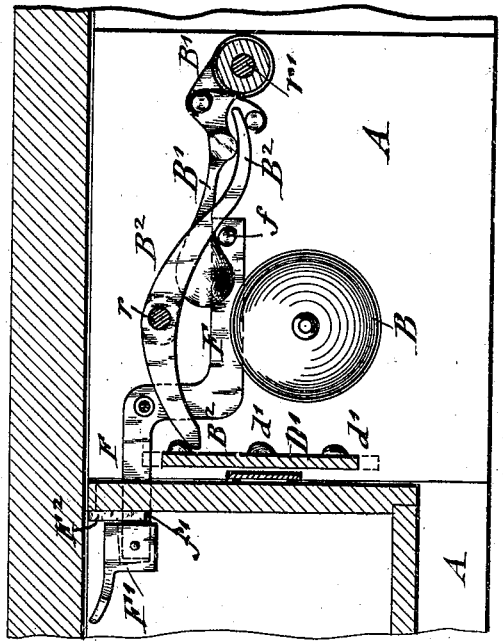
Figure 4:
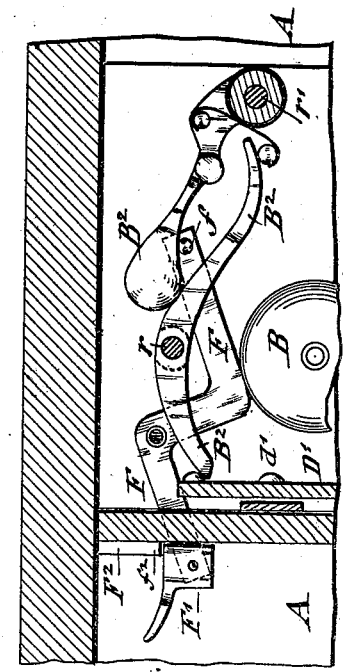
Figure 2:
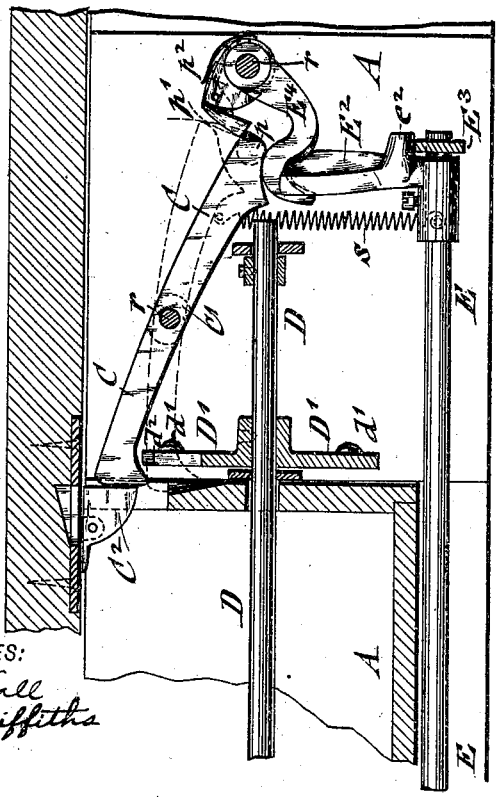
Figure 5:
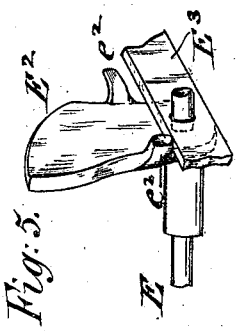

In the accompanying drawings Figure 1, represents a plan-view of a money-till with my improved alarm-device. Fig. 2, is a vertical longitudinal section on line 2 2, Fig. 1, showing the till in locked position. Fig. 3, is a vertical longitudinal section on line 3 3, Fig. 1, showing the alarm-device proper. Fig. 4, is also a longitudinal section of the alarm-device on line 3 3, Fig. 1, showing the spring-tongue set into raised position, so as not to strike the bell. Fig. 5, is a perspective view of the cam by which the locking-lever is actuated, and Figs. 6 and 7, are vertical transverse sections, respectively on lines 5 5 and 6 6, Fig. 1, both sections being taken in the direction of the arrows, shown in Fig. 1.

Similar letters of reference indicate corresponding parts.

Referring to the drawings A represents a money-till or drawer, which is provided with the usual number of pockets $a$ $a$ for the change and with two or more compartments for the banknotes. At the middle rear-portion of the money-till A is arranged the alarm-device and the mechanism for actuating the same. The alarm-device consists of a bell B and a spring-actuated tongue B', which latter is actuated by a lever $B^2$ that is fulcrumed by a sleeve or hub to a fixed pivot-rod $r$. The front-end of the lever $B^2$ is engaged by an actuating disk D', which is arranged at right angles to the lever $B^2$ and provided near its circumference with a number of projections $d'$ that engage successively the front-end of the lever $B^2$ and produce thereby the ringing of the bell when the spindle D of the actuating disk D' is turned by its handle $D^2$ attached to its front-end. The spindle D is supported in suitable bearings of the money-till A and its handle $B^2$ provided with a suitable index by which the relative position of the actuating disk D' is indicated. The actuating disk D' is provided at one point of its circumference with a radial recess $d^2$ which is of sufficient size to permit the entrance of the locking-lever C that is fulcrumed by its sleeve or hub C' to the pivot-rod $r$ to which the lever $B^2$ is also pivoted. The locking lever C is lowered into the recess $d^2$ by the action of a second spindle E which is supported in a horizontal position below the spindle D' in suitable front and rear bearings of the till A and which is provided at its front-end with a handle E' and at its rear-end with a curved cam $E^2$. The cam $E^2$ is provided with backwardly-bent lugs $c^2$ at opposite sides, of which one is located slightly lower than the other on the cam, said lugs serving as stops for arresting the rocking motion of the cam in connection with a transverse bar $E^3$ of the till A, as shown in Figs. 3 and 6. The cam $E^2$ engages a hook-shaped arm $E^4$ which is pivoted to the same transverse rod $r'$ to which the spring-tongue B' is pivoted. The rear-end of the locking-lever C rides on the upper end of the hook-shaped arm $E^4$ and is held in contact with the same by a helical spring $s$ that is attached to the hub of the cam $E^2$ and to the rear-part of the locking-lever C, as shown clearly in Figs. 2 and 7. To the rear-end of the locking-lever C is applied a laterally projecting pin $p$, which engages a pivoted and spring-actuated projection $p'$ fulcrumed to the lugs $p^2$ on the hub of the spring-tongue B' so that when the rear-end of the locking-lever C is lifted by the cam $E^2$, owing to the turning motion of the spindle E the spring-tongue is operated, so as to ring the bell. At the same time the front-end of the locking-lever C is lowered and placed in the recess $d^2$ of the actuating disk D', so that the money-till can be opened, the alarm-bell indicating whenever the money-till is opened for inserting money or making change. The alarm-device is also operated whenever the spindle of the actuating disk is turned, so that any attempts of meddling with or efforts for opening the till are indicated, so that any unauthorized manipulation or tampering with the till can be prevented.

As it may be annoying to the party who uses the till to hear the frequent ringing of the alarm-device by the turning action of the spindle of the actuating disk and by operating the spindle of the locking-lever, a device is arranged by which the spring-tongue B' can be lifted and secured in raised position so as not to be engaged either by the actuating lever $B^2$ or by the locking lever C. This is accomplished by a bell-crank lever F, which is fulcrumed to the partition on which the alarm-device is supported, and the rear-end of which engages the spring-tongue B' by a pin $f$ while the front-end of the bell crank lever passes through the transverse front-wall of the compartment in which the alarm-device is arranged and is provided with a pivoted thumb-piece F' which is set below the shoulder $f'$ formed by the slotted plate $F^2$ in which the front-end of the lever F is guided as shown in Fig. 4. When the lever F is set into locked position by its thumb-piece F' the spring-tongue B' is supported in raised position by the rear end of the bell crank lever F, as shown in Fig. 4, so as to be out of engagement with the actuating lever $B^2$ and locking lever C. The spindles of the actuating disk D' and of the locking lever C can now be turned without the ringing of the alarm bell and the opening and closing of the till be accomplished without alarm in the usual manner.

My improved alarm-device for money-tills is operated as follows: The spindle D of the actuating disk D' is first set with its index in such a position toward the front-wall of the till, that the recess $d^2$ of the actuating disk D' is placed in a vertical line with the locking lever C. The spindle E is then turned, so that the rear-end of the locking lever C is raised by the cam $E^2$ and hook-shaped arm $E^4$ and the front-end of the locking lever C placed into the recess $d'$ of the actuating disk D', so as to clear the stop $C^2$, which is pivoted to the under side of the covering-plate or table of the money-till, as shown in Fig. 2. The stop $C^2$ is pivoted so as to have some play in vertical direction, so that the money-till A can be returned into closed position without exerting too great a pressure on the locking lever C by the stop $C^2$, when the front-end of the locking lever passes below the same during the inward motion of the money-till. Whenever the bell is rung, either by the mechanism operated by the actuating disk, or by the spindle of the locking lever, an alarm is thereby given and notice drawn to the fact that the money-till is attempted to be operated. When the money-till is returned into its closed position, the spindle of the actuating disk D' is turned so that the recess of the actuating disk is not in line with the locking lever, in which position the money-till cannot be opened by an outsider until the required position of the actuating-disk is re-established relatively to the locking-lever. The alarm-device forms thus a valuable auxiliary to the locking of the money-till by the locking lever and furnishes a safeguard for the contents of the till.

Having thus described my invention, I claim as new and desire to secure by Letters Patent—

1. The combination with a spindle and an actuating-disk on said spindle provided with a radial recess, of an alarm-device operated by said disk, a fulcrumed locking lever arranged in one plane with the spindle of the actuating disk, a spindle for operating said locking lever, a stop or abutment for the locking lever and mechanism interposed between said spindle and the locking lever so as to move the same into the recess of the actuating-disk for clearing the stop when the till is to be opened, substantially as set forth.

2. The combination, of an actuating-disk, having a radial recess, a spindle for turning said disk, an alarm device operated by said disk, a fulcrumed locking lever arranged in one plane with the spindle of the disk, a stop for the locking lever, a spindle for operating the locking lever, a cam on said spindle, an intermediate pivot-arm engaged by said cam, said arm being adapted to lift the rear-end of the locking lever and place its front-end into the recess of the actuating-disk, so as to clear the stop for opening the till, substantially as set forth.

3. The combination, with an actuating-disk having projections near its circumference, of a spindle for turning said disk, an alarm-bell, a spring-actuated tongue for ringing said bell, a fulcrumed lever interposed between the spring-tongue and the projections of the actuating-disk and means for locking the spring-tongue in raised position so as to discontinue the ringing of the bell by the actuating disk, substantially as set forth.

4. The combination, of an actuating disk having projections near its circumference, a spindle for turning the disk, an alarm-bell, a spring-actuated tongue, a fulcrumed lever interposed between the spring-tongue and the actuating-disk, a fulcrumed bell-crank lever adapted to engage the spring-tongue, a thumb-piece pivoted to the front-end of said elbow-lever and a stop-shoulder for retaining said thumb-piece and elbow-lever in depressed position, while the spring-tongue is supported in raised position, so as to prevent the ringing of the bell by the actuating-disk, substantially as set forth.

5. The combination, of an actuating-disk, having projections near its circumference and a radial recess, a spindle for turning said disk, an alarm-device adapted to be operated by said disk, a fulcrumed locking lever located in one plane with said spindle, a second spindle below the disk-spindle, a cam on the lower-spindle, said cam being provided with stop-lugs, a transverse bar arresting the lugs of said cam and a pivoted arm riding in said cam and engaging the rear-end of the locking lever, so as to raise the same and lower the front-end of the lever, substantially as set forth.

In testimony that I claim the foregoing as my invention I have signed my name in presence of two subscribing witnesses.

PETER ZIEGLER.

Witnesses:
PAUL GOEPEL,
CHARLES SCHROEDER.